April 5, 1932.  G. H. JUMP  1,853,004
CONTROL SYSTEM FOR ASYNCHRONOUS MACHINES
Filed May 5, 1931

Inventor:
George H. Jump,
by Charles E. Tullar
His Attorney.

Patented Apr. 5, 1932

1,853,004

UNITED STATES PATENT OFFICE

GEORGE H. JUMP, OF BUFFALO, NEW YORK, ASSIGNOR TO GENERAL ELECTRIC COMPANY, A CORPORATION OF NEW YORK

CONTROL SYSTEM FOR ASYNCHRONOUS MACHINES

Application filed May 5, 1931. Serial No. 535,220.

My invention relates to automatic control systems for asynchronous machines and its principal object is to provide an arrangement of apparatus which automatically energizes the secondary winding of an induction motor to induce in the primary winding of the motor a voltage whose value and phase is so related to the voltage of an alternating current source that a relatively small current will flow between the source and the primary winding at the instant the latter is connected to the source. Additional objects of my invention are described during the progress of this specification.

It is desirable to avoid large starting currents in induction motors because such currents tend to interfere with the voltage regulation of the source connected to the motor and also because such currents may harm the motor windings. A large starting current in medium and large size induction motors is especially objectionable because their starting currents may be a large proportion of the current capacity of the source and also because their rotaing elements usually have considerable inertia which results in a comparatively long starting period.

In United States Patent No. 1,814,810, issued to me on July 14, 1931, and assigned to the assignees of the present invention, I have illustrated and described an arrangement for placing a wound secondary induction motor into operation with a relatively small current flow at the instant the motor is connected to the alternating current source. This arrangement comprises a starting motor for bringing the induction motor to approximately its synchronous speed, manually controlled regulating apparatus for energizing the induction motor secondary winding to produce a predetrmined vector difference between the voltages of the alternating current source and of the motor primary winding, this vector difference having a suitable value to result in a relatively small current flow into the motor primary winding at the instant the latter is connected to the source, and an automatic synchronizing device which connects the primary winding to the source on the occurrence of this vector difference.

In United States Patent 1,778,599, Hull et al., October 14, 1930, assigned to the assignees of the present invention, there is illustrated and described a frequency converter set connected between two alternating current sources. The set comprises a synchronous motor connected to one of the sources and a wound secondary induction motor connected to the other source. A frequency changing machine and a regulating machine are suitably arranged to energize the induction motor secondary winding, and current responsive control means automatically shift two brush yokes on the frequency changing machine to maintain a desired flow of energy current between the two sources. Frequency converter sets usually have large size motors and are usually placed into operation by first bringing the induction motor to speed and then connecting the synchronous motor to its source. It is desirable to have a relatively small current flow into the induction motor primary winding at the instant the latter is connected to its source and to have automatically operated apparatus to produce the proper conditions for giving this relatively small current flow. I have conceived an arrangement of automatically operated control apparatus which accomplishes the above desired objects without employing the expensive voltage reducing means or secondary resistances that are ordinarily employed in starting the induction motor. Briefly described, my arrangement consists of a starting motor for bringing the induction motor to approximately its synchronous speed, an automatic synchronizing device similar to the one illustrated in my previously mentioned patent, and in addition, I provide in accordance with my invention, control means for automatically shifting the two brush yokes on the frequency changing machine before the motor primary winding is connected to its source to produce the previously described predetermined vector difference which causes operation of the automatic synchronizing device to connect the motor primary winding to its source. My arrangement is also adapted to accomplish the above described object when the induction motor is employed for driving the usual type of motor load.

A small motor is usually employed for shifting the brush yokes on the frequency changing machine. This small motor should be operated by the control means contemplated by my invention before the induction motor is connected to its source and should be operated by the current responsive control means shown in Patent 1,778,599 after the induction motor is connected to its source. It is therefore desirable to provide means for transferring the operation of this small motor from one set of control means to the other set of control means at the proper time. In accordance with my invention, I provide automatically operated transferring means so arranged that before the induction motor is connected to its source the control means contemplated by my invention are automatically connected to control the operation of this small motor and when the induction motor is connected to its source the current responsive means are automatically connected to control the operation of this small motor.

The induction motor of the frequency converter set is sometimes connected to a 25 cycle system supplying current to an electric railroad. It often happens that excessively heavy loads or other disturbances on the railroad cause the tripping out of the switch connecting the induction motor to its source. The induction motor however continues to run at the speed of the synchronous motor, which speed may be, and usually is, different from the speed of the starting motor employed for initially bringing the induction motor to speed. Thus, the starting motor usually brings the induction motor to slightly below its synchronous speed whereas the synchronous motor may drive the induction motor below, at, or above its synchronous speed. It is therefore desirable that my arrangement should be able to produce the desired predetermined vector difference between the voltages of the source and of the induction motor primary winding whether the induction motor is driven by the starting motor, or by the synchronous motor. I obtain this desired result by providing means for initially impressing on the induction motor secondary winding a predetermined value of slip frequency voltage which, if the induction motor is brought to its synchronous speed, is capable of producing a vector difference between the voltages of the source and of the motor primary winding having a magnitude lying between predetermined values. The maximum value of this vector difference corresponds to the previously described predetermined vector difference, thus assuring proper conditions for connecting the motor primary winding to the source if the motor is brought to its synchronous speed. In addition, I provide means to vary the voltage impressed on the motor secondary winding for producing the above described vector difference when the motor is brought to above or below its synchronous speed.

My invention will however be best understood from the following description when considered in connection with the accompanying drawing, while those features of my invention which are believed to be novel and patentable are pointed out in the appended claims.

Figure 1:
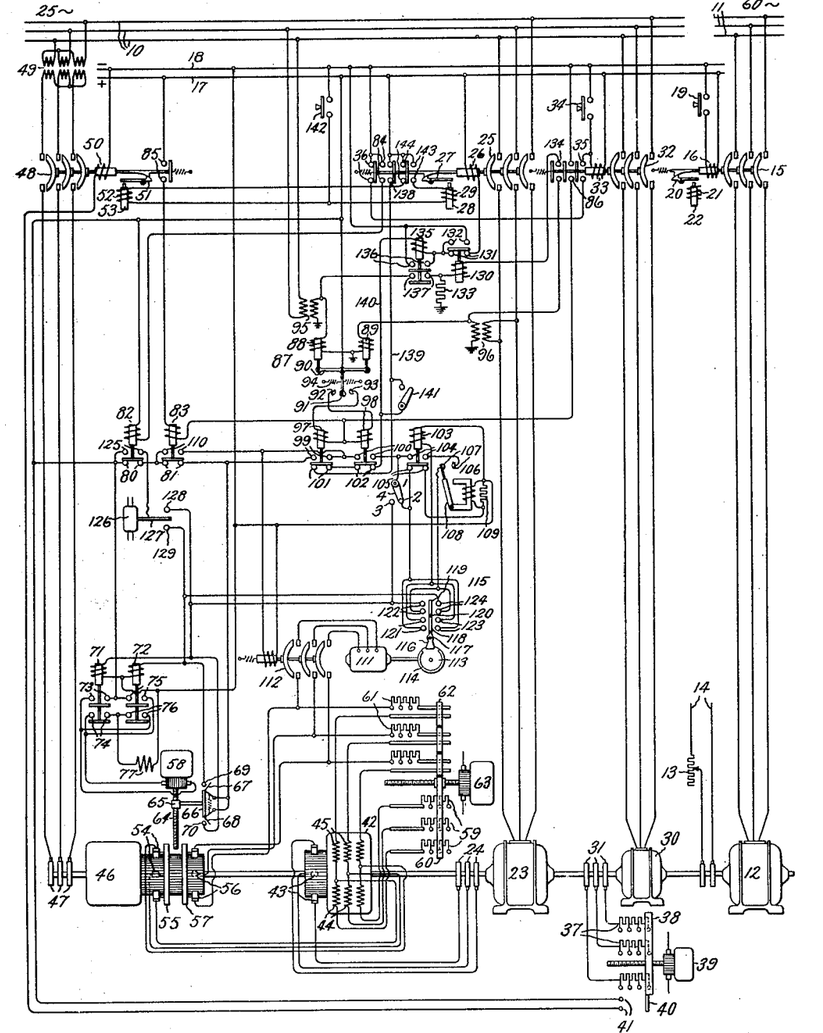

The single figure of the drawing represents in diagrammatic form a preferred embodiment of my invention which may be applied to an induction motor whether the latter is acting as one element of a frequency converter set or is employed for driving the usual type of motor load. All parts in the drawing are shown in their normal positions with the frequency converter set at rest. 10 and 11 respectively represent 25 and 60 cycle alternating current sources. 12 represents a synchronous motor acting as one element of the frequency converter set. The motor 12 is preferably shown with a rotating field connected in series with an adjustable resistance 13 to a direct current source 14. The primary winding of motor 12 may be connected to the source of any suitable switch, as for example by switch 15. The switch 15 has a closing coil 16 which may be energized from a direct current control source represented by lines 17 and 18, by closing a normally open push button switch 19. It is immaterial to the description of my invention how switch 19 is closed and I have therefore represented it as a manually operated switch. The switch 15 is held closed by a latch 20 and may be opened by energizing a coil 21 surrounding a tripping plunger 22. An induction motor 23 represents the other element of the frequency converter set, this motor being preferably represented with a rotating wound secondary connected to collector rings 24. The primary winding of motor 23 may be connected to the source 10 by closing a switch 25. The switch 25 has a closing coil 26, a latch 27 for holding the switch closed and a tripping plunger 28 for opening the switch when a coil 29 surrounding this plunger is energized.

An induction motor 30 is employed for starting and bringing the main induction motor 23 to approximately its synchronous speed. The motor 30 is preferably represented with a rotating wound secondary connected to collector rings 31. The primary winding of motor 30 may be connected to the source 10 by closing a switch 32 having a closing coil 33. The coil 33 may be energized from lines 17 and 18 by closing a normally open push button switch 34. It is immaterial to the description of my invention how switch 34 is closed and I have therefore represented it as a manually operated switch. The closing of switch 34 causes the closing of switch 32 which closes its auxiliary contacts 35. The closing of contacts 35 completes a locking circuit for coil 33. This locking circuit is from line 17, through coil 33, contacts 35 and auxiliary contacts 36 on switch 25 to line 18. The switch 32 therefore remains closed until auxiliary contacts 36 are opened. The collector rings 31 of starting motor 30 are connected to resistances 37 which are adapted to be cut out by an arm 38 which is moved by a direct current motor 39. The control means for motor 39 are not illustrated since they are immaterial to the description of my invention. The arm 38 has an extension 40 adapted to close contacts 41 when resistances 37 are cut out. The secondary winding of motor 23 is concatenated with a commutator type regulating machine 42 which has its commutator brushes 43 connected to collector rings 24. The machine 42 has two exciting windings 44 and 45 which are energized by a commutator type frequency changer 46. The frequency changer 46 has collector rings 47 which may be connected by a switch 48 to the secondary windings of a transformer 49 which is energized by the source 10. The switch 48 has a closing coil 50 which is connected so that it will be energized from lines 17 and 18 when contacts 41 are closed by extension 40. The switch 48 is held closed by a latch 51 and may be opened by energizing a coil 52 surrounding a tripping plunger 53. On the commutator of the frequency changer 46 rest two sets of circumferentially spaced apart brushes. One set of brushes represented by 54 is supported by a yoke 55, and the other set of brushes represented by 56 is supported by a yoke 57. The yokes 55 and 57 are adapted to be shifted by a direct current series type motor 58, and any suitable mechanism may be employed between the motor and yokes for shifting the latter in the desired manner. An example of such a mechanism is illustrated in Figs. 2, 3 and 4 of United States Patent 1,778,599. In the present patent application I am not illustrating the mechanism between the motor and yokes as such illustration is unnecessary to the description of my invention. One set of ends from exciting windings 44 and 45 are connected to brushes 54. The other set of ends of windings 44 are connected to resistances 59 which are adapted to be cut out by an arm 60. The other set of ends of windings 45 are connected in series with resistances 61 to brushes 56. The resistances 61 are adapted to be cut out by arms 62. The arms 60 and 62 are adapted to be moved by a motor 63. The above described arrangement of exciting windings, resistances, brushes, etc., is similar to that shown in Fig. 1 of United States Patent 1,778,599. Motor 63 brings arms 60 and 62 to predetermined positions whenever motor 23 is disconnected from the source 10.

It is unnecessary for the description of my invention to illustrate and describe the means employed for this purpose. Any of the suitable means well known to those skilled in the art may be employed, as for example, the means illustrated and later described in connection with series motor 58 that are employed for a similar purpose. The predetermined positions of the arms 60 and 62 may vary with each particular installation and hence it should be understood that the positions shown are only illustrative. To simplify the drawing all the rotating machines are shown arranged for operation at the same speed but obviously they may be otherwise arranged. The frequency changer 46 has the same number of poles as the motor 23 and, therefore, the voltages at brushes 54 and 56 have the slip frequency of motor 23. It is clear that a substantially constant voltage is impressed on windings 44 irrespective of the position of yokes 55 and 57, whereas the voltage impressed on windings 45 depends on the relative positions of the yokes. The closing of contacts 41 by extension 40 automatically causes switch 48 to close, thus impressing on the secondary winding of motor 23 a slip frequency voltage whose magnitude depends on the relative positions of yokes 55 and 57. The voltage induced in the primary winding of motor 23 will have the frequency of the source 10.

Assume for example that the E. M. F. of the source 10 is 500 volts and that it is desired to connect the primary winding of motor 23 to source 10 when the vector difference between the voltages of the primary winding and of the source 10 has a maximum value of 25 volts with the voltage of the primary winding lower than that of the source. The automatic synchronizing device which I preferably illustrate for connecting the primary winding to the source when the vector difference is 25 volts or less will be described later. It is therefore necessary to build up in the primary winding of motor 23 at least 475 volts, assuming that this voltage will be directly opposite in time phase to the voltage of the source 10. It is also desirable not to have wide swings of the primary winding voltage during the synchronizing period. These objects are accomplished by my arrangement which provides means for initially bringing yokes 55 and 57 to predetermined relative positions so that the closing of switch 48 to energize the frequency changer 46 results in initially impressing on the secondary winding of motor 23 a voltage corresponding to the predetermined relative positions of yokes 55 and 57. These predetermined relative positions are so selected that if motor 23 is brought to its synchronous speed, there will be produced a vector difference between the voltages of the source 10 and of the motor primary winding having a magnitude lying between zero and 25 volts for the assumed maximum vector difference of 25 volts, and for illustrative purposes I prefer to assume that a substantially zero vector difference is produced. It follows that if motor 23 is brought to its synchronous speed, the automatic synchronizing device will operate to connect the motor primary winding to the source 10. I also provide means for moving the brush yokes from their predetermined relative positions to produce the assumed maximum vector difference of 25 volts when motor 23 is brought to below or above its synchronous speed so that the synchronizing device can operate to connect the motor primary winding to the source 10. It is preferable and I have found it satisfactory to leave arms 60 and 62 in the same positions with the motor 23 brought to below, at, or above its synchronous speed, although in some cases it may be desirable to change the positions of these arms for the different speeds of motor 23. Wide swinging of the primary winding voltage during the starting period is avoided because I initially impress on the secondary winding a voltage which has the correct value if motor 23 has been brought to its synchronous speed and then increase this voltage a relatively small amount if motor 23 is brought to below or above its synchronous speed.

The brush yokes 55 and 57 are brought to their predetermined relative positions by the following arrangement. The series motor 58 has a threaded shaft 64 on which there is a threaded follower 65 secured to an arm 66. The arm 66 is adapted to cooperate with pivoted switch blades 67 and 68. The blade 67 is adapted to close contact 69 when arm 66 has traveled slightly downward from the illustrated position, and blade 68 is adapted to close contact 70 when arm 66 has traveled slightly upward from the illustrated position. The follower 65 is so placed on shaft 64 that arm 66 engages both switch blades to prevent them from closing their respective contacts when yokes 55 and 57 are at their predetermined relative positions. In this particular embodiment of my invention I prefer to adjust follower 65 so that there will be substantially zero voltage impressed on exciting windings 45 when yokes 55 and 57 are at their predetermined relative positions. The direction of rotation of motor 58 is controlled by relays 71 and 72. Relay 71 has two pairs of normally open contacts 73 and 74. Relay 72 has two pairs of normally open contacts 75 and 76. One end from each of the coils of relays 71 and 72 are connected directly to line 18 and the other ends are connected to contacts 70 and 69 respectively. The motor 58 has a series field winding 77 which has one end connected directly to line 18 and the other end connected to a contact 74 and a contact 76. The line 17 is connected directly to a contact 73 and a contact 75 and is also connected to switch blades 67 and 68 through normally closed contacts 80 and 81 of relays 82 and 83 respectively. The coil of relay 82 has one end connected directly to line 17 and the other end connected to line 18 through auxiliary contacts 84 on switch 25. The coil of relay 83 has one end connected to line 17 through auxiliary contacts 85 on switch 48 and the other end connected to line 18 through auxiliary contacts 86 on switch 32. With switches 25, 32 and 48 open the switch blades 67 and 68 are connected to line 17 through contacts 81 and 80 of relays 83 and 82. Assume that yokes 55 and 57 are not at their predetermined relative positions and that arm 66 is above the illustrated position. The contact 69 remains open and contact 70 will be closed by blade 68. The closing of contact 70 completes an energizing circuit from lines 17 and 18 for the coil of relay 71, causing the latter to close. The closing of relay 71 completes an energizing circuit from lines 17 and 18 for motor 58 to rotate it in the direction for lowering arm 66. When arm 66 reaches the illustrated position, blade 68 opens contact 70, causing relay 71 to open and deenergizes motor 58. If yokes 55 and 57 are not at their predetermined relative positions and arm 66 is below the illustrated position, then contact 70 remains open and contact 69 will be closed by blade 67. The closing of contact 69 completes an energizing circuit from lines 17 and 18 for the coil of relay 72 causing the latter to close. The closing of relay 72 completes an energizing circuit from lines 17 and 18 for motor 58 to rotate it in the direction for raising arm 66. When arm 66 reaches the illustrated position blade 67 opens contact 69, causing relay 72 to open and deenergize motor 58. It is clear that yokes 55 and 57 will be automatically brought to their predetermined relative positions. The closing of switch 32 energizes motor 30 and when resistances 37 are cut out the motor is running slightly below its synchronous speed. When resistances 37 are cut out, extension 40 closes contacts 41 and switch 48 closes. When switch 48 closes, substantially zero voltage is impressed on exciting windings 45 whereas the voltage existing between brushes 54 is impressed on exciting windings 44. The predetermined positions of yokes 55 and 57 and arms 60 and 62 are so chosen that the voltage impressed on exciting windings 44 will cause regulating machine 42 to impress on the secondary winding of motor 23 a voltage whose magnitude and phase would produce a substantially zero vector difference between the voltages of the source 10 and of the motor primary winding if motor 23 has been brought to its synchronous speed. At synchronous speed of motor 23 there is no voltage induced in its secondary winding and the voltage impressed on the latter has to overcome only the resistance drop of the current flowing in the secondary winding. When motor 23 is brought to above or below its synchronous speed there is a voltage induced in its secondary winding, this voltage having relatively opposite directions above and below synchronous speed. If the voltage impressed on the motor secondary winding above or below synchronous speed remains the same as at synchronous speed, then the voltage induced in the secondary winding will cause a decrease in the secondary winding current from the value it had at synchronous speed besides changing the phase position of this current, thus increasing the vector difference between the voltages of the source 10 and of the motor primary winding from the value existing at synchronous speed. I have assumed as an example that the vector difference may vary between predetermined values with a maximum value of 25 volts and it is therefore clear that when motor 23 is operated with sufficient slip above or below its synchronous speed the vector difference will exceed 25 volts. I reduce the vector difference to the assumed maximum value of 25 volts by impressing on the secondary winding an additional voltage that opposes its induced voltage. To accomplish this result I provide relay means responsive to the difference between the voltages of the source 10 and the primary winding of motor 23 and other relay means responsive to operation of motor 23 away from its synchronous speed. The above mentioned relay means cause operation of motor 58 to separate the brushes supported by yokes 55 and 57 so that the voltage impressed on exciting windings 44 results in impressing on the secondary winding a voltage component whose phase and magnitude are substantially the same as at synchronous speed and the voltage impressed on exciting windings 45 results in impressing on the secondary winding a second voltage component approximately equal and opposite in phase to the induced voltage in the secondary winding. For operation of motor 23 above synchronism, the series motor 58 rotates in one direction to shift yokes 55 and 57 relatively to each other in one manner from their predetermined relative positions, and for operation of motor 23 below synchronism the series motor 58 rotates in the opposite direction to shift the yokes relatively to each other in the opposite manner from their predetermined relative positions. The reversal of the direction of rotation of motor 58 is brought about by the relay means responsive to operation of motor 23 away from its synchronous speed. If motor 23 is always brought to either above or below its synchronous speed before its primary winding is to be connected to source 10, then motor 58 should rotate in the same direction each time to bring about the predetermined vector difference and it is only necessary to employ the relay means responsive to the difference between the voltages of the source and the motor primary winding. If desired the relay means responsive to operation of motor 23 away from its synchronous speed may be employed at the same time to cause operation of motor 58 during recurring predetermined time intervals. If however motor 23 is sometimes brought to above and sometimes to below its synchronous speed before its primary winding is to be connected to source 10, then motor 58 must be capable of rotating in either direction to produce the predetermined vector difference and it will then be necessary to employ both of the above mentioned relay means. Whether one or both of the above mentioned relay means are employed, it is clear that they should assume control of series motor 58 after motor 23 has been brought to speed and switch 48 closed.

The relay means responsive to the difference between the voltages of the source and of the motor primary winding is preferably shown as a well known form of voltage balance relay represented by 87. Relay 87 has two movable cores 88 and 89 secured to opposite ends of an arm 90 which is pivoted at its center as shown. A switch blade 91 is secured to arm 90. Stationary contacts 92 and 93 are respectively placed on opposite sides of blade 91 and one or the other of these contacts will be closed by the blade when the latter is moved to the right or left of the position shown. Springs 94 normally keep blade 91 midway between contacts 92 and 93. Two potential transformers 95 and 96 have their primary windings respectively connected to corresponding phase leads of the source 10 and the primary winding of motor 23. The secondary winding of transformer 95 energizes a coil surrounding core 88 and the secondary winding of transformer 96 energizes a coil surrounding core 89, grounded circuits being employed. The relay 87 controls the operation of relays 97 and 98 each of which has a pair of normally open contacts 99 and 100 respectively and a pair of normally closed contacts 101 and 102 respectively. The switch blade 91 is connected directly to line 17 and contacts 92 and 93 are respectively connected to one end of the coils of relays 98 and 97, the other ends of these coils being adapted for connection to line 18 through the auxiliary contacts 86 of switch 32.

The relay means responsive to operation of motor 23 away from its synchronous speed consists of the following arrangement. A small motor 111, preferably a self-starting synchronous motor, is adapted to be connected by a switch 112 to brushes 56 supported by yoke 57. The switch 112 has a closing coil, one end of which is connected directly to line 18 with the other end of this coil adapted for connection to line 17 through normally open contacts 110 of relay 83 and normally closed contacts 80 of relay 82. The motor 111 drives a cam 113 having a U-shaped projection 114 at its front end. The cam 113 operates a relay 115. The relay 115 comprises a lever 116 pivoted at 117 with the lower end of the lever shaped to fit loosely in the U-shaped slot formed by projection 114. The portion of lever 116 above pivot 117 is adapted to function as two switch blades 118 and 119, insulated from each other by a strip of insulating material 120. Two pairs of normally open contacts 121 and 122 are adapted to be closed by switch blades 118 and 119 respectively when these blades are moved to the left, and two pairs of normally open contacts 123 and 124 are adapted to be closed by these blades when they are moved to the right. The connections between the contacts 121 to 124 inclusive and relays 103 and 106 are obvious and need not be described in detail. The synchronous speeds of motor 23 and frequency changer 46 occur simultaneously and the phase sequence of the voltages between brushes 56 supported by yoke 57, as well as those of brushes 54 supported by yoke 55, reverse when the frequency changer passes through synchronous speed. It is clear that the speed of motor 111 will be proportional to the slip frequency of motor 23 and motor 111 will rotate in one direction when motor 23 runs below its synchronous speed and in the opposite direction when motor 23 runs above its synchronous speed. Assume that when motor 23 runs below its synchronous speed, motor 111 rotates cam 113 clockwise. The following action occurs during each revolution of cam 113. The left hand edge of projection 114 pushes the lower end of lever 116 to the right from the illustrated position and the lower end of lever 116 will slide on the outer circumference of projection 114, thus causing blades 118 and 119 to close contacts 121 and 122 respectively. When projection 114 has revolved sufficiently so that its right hand edge reaches the lower end of lever 116, the lower end will drop into the U-shaped slot, thus causing the opening of contacts 121 and 122. Contacts 121 and 122 are therefore opened and closed once during every revolution of motor 111. It is clear that when motor 23 runs above its synchronous speed, motor 111 rotates cam 113 counter-clockwise and switch blades 118 and 119 close and open contacts 123 and 124 respectively once during every revolution of motor 111.

When relays 87 and 115 are both employed to cause operation of motor 58, then they jointly control relays 103 and 106, which in turn control motor 58 so that the latter operates during recurring predetermined time intervals to bring about the predetermined vector difference between the voltages of the source and of the motor primary winding.

Relay 103 has a pair of normally open contacts 104 and a pair of normally closed contacts 105. Relay 106 has a pair of normally open contacts 107 adapted to be closed by a pivoted switch blade 108. A resistance 109 is connected across the coil of relay 106. The resistance 109 acts as a discharge resistance for the coil of relay 106 when this coil is disconnected from lines 17 and 18, thus permitting a gradual dying out of the current in the coil and therefore blade 108 opens contacts 107 a predetermined time interval after the coil is disconnected from lines 17 and 18, the time interval depending on the value of resistance 109. Relay 106 represents a well known type of time delay relay but any other suitable type may be used. One contact 99 of relay 97 is connected to switch blades 67 and 68. The other contact 99 of relay 97 and one contact 100 of relay 98 are adapted to be connected to line 17 through normally open contacts 110 of relay 83 and normally closed contacts 80 of relay 82. One end of the coils of relays 103 and 106 are connected directly to line 18. The remaining connections between the relays are obvious and need not be described in detail.

The selection of whether motor 58 should be controlled by the operation of relay 87 or by the joint operation of relays 87 and 115 is accomplished by closing the proper contact on switch 1. This switch has contacts 2 and 3, either of which can be closed by a blade 4 which is connected to the right hand contact 100 of relay 98. The contact 2 is connected to the left hand contact 105 of relay 103 and to a contact 121 and 123 of relay 115. The contact 3 should be connected to an end of the coil of relay 71 or 72 depending on whether motor 23 is brought to below or to above its synchronous speed before its primary winding is to be connected to the source. When as shown in the drawing, switch 1 has its contact 2 closed and its contact 3 open, then motor 58 is suitably controlled by the joint operation of relays 87 and 115 whether motor 23 is always brought either to below or to above its synchronous speed or is sometimes brought to below and sometimes to above its synchronous speed before its primary winding is to be connected to the source. If switch 1 has its contact 3 closed and its contact 2 open, then motor 58 will be suitably controlled by the operation of relay 87 only when motor 23 is always brought to either below or to above its syncronous speed before its primary winding is to be connected to the source. When motor 23, acting as one element of a frequency converter set or driving the usual type of motor load, is always brought to below its synchronous speed before its primary winding is to be connected to the source, then the contact 3 of switch 1 is connected to an end of the coil of relay 71, as shown in the drawing, since I am assuming that for below synchronous operation of motor 23 the relay 71 will connect motor 58 to lines 17 and 18 so that motor 58 rotates in the proper direction to bring about the predetermined vector difference between the voltages of the source and the motor primary winding. If however motor 23 is always brought to above its synchronous speed, then it is obvious that under the above assumed conditions the contact 3 of switch 1 should be connected to an end of the coil of relay 72.

The following is a description of the operation of the apparatus when switch 1 has its contact 2 closed and its contact 3 open, thus having motor 58 controlled by the joint operation of relays 87 and 115. With all of the apparatus at rest, yokes 55 and 57 are automatically brought to their predetermined relative positions. Assume that push button 34 is closed. Switch 32 closes, motor 23 is brought to slightly below its synchronous speed and switch 48 closes. The closing of switches 32 and 48 closes contacts 86 and 85 respectively, thus connecting the coil of relay 83 to lines 17 and 18 and this relay operates to open its contacts 81 and close its contacts 110. The opening of contacts 81 disconnects switch blades 67 and 68 from line 17 and therefore these blades can not control relays 71 and 72. The closing of contacts 110 starts the operation of motor 58 under the joint control of relays 87 and 115 as hereinafter described in detail. The closing of contacts 110 completes the following circuit, from line 17 through contacts 80 and 110 of relays 82 and 83 respectively, and through the closing coil of switch 112 to line 18. Switch 112 closes and starts motor 111. The contacts 121 and 122 of relay 115 will be opened and closed by switch blades 118 and 119 once during every revolution of motor 111, it being assumed that motor 111 rotates clockwise when motor 23 runs below its synchronous speed. If the speed of motor 23 is such that when switch 48 is closed the induced voltage in the primary winding of motor 23 builds up to 475 volts, or above, the automatic synchronizing device will immediately operate to close switch 25 and connect the motor primary winding to the source.

Assume however, for example, that the speed of motor 23 is such that when switch 48 is closed the voltage in the primary winding of motor 23 builds up to 450 volts. Also assume for example that the distance between switch blade 91 and contacts 92 and 93 on the voltage balance relay 87 and the tension of springs 94 on this relay are so adjusted that it requires 20 volts difference between the voltages of source 10 and of the primary winding of motor 23 to cause blade 91 to close either of contacts 92 or 93. It follows that blade 91 will close contact 92 since the voltage of source 10 is higher than that of the motor primary winding. The closing of contact 92 completes the following circuit, from line 17 through blade 91, contact 92, coil of relay 98 and contacts 86 of switch 32 to line 18, this switch being closed. Relay 98 operates to close its contacts 100. The left hand contact 100 of relay 98 is now connected to line 17 through contacts 110 and 80 of relays 83 and 82 respectively. There are now three separate circuits from the left hand contact 100 of relay 98 to line 18. One circuit includes contacts 100 of relay 98, contacts 104 and 107 of relays 103 and 106 respectively when relays 103 and 106 are closed as will be subsequently described, contacts 122 of relay 115 which are closed and opened as previously described, and the coil of relay 71. The second circuit includes contacts 100 of relay 98, contact 2 of switch 1, contacts 121 of relay 115 which are closed and opened as previously described, and the coil of relay 103. The third circuit includes contacts 100 of relay 98, contact 2 of switch 1, the normally closed contacts 105 of relay 103, and the coil (in parallel with resistance 109) of relay 106. The second and third circuits control the closing and opening of the first circuit in the following manner. The closing of contacts 100 of relay 98 completes the third circuit, thus connecting the coil of relay 106 to lines 17 and 18 and relay 106 closes its contacts 107. The contacts 121 and 122 of relay 115 are closed at substantially the same instant. The closing of contacts 121 of relay 115 completes the second circuit, thus connecting the coil of relay 103 to lines 17 and 18, and relay 103 opens its contacts 105 and closes its contacts 104. The contacts 104 and 122 of relays 103 and 115 respectively are therefore closed at substantially the same instant, thus completing the first circuit. But contacts 105 of relay 103 are opened at substantially the same instant its contacts 104 are closed, therefore opening the third circuit and disconnecting the coil of relay 106 from lines 17 and 18. If the relay 106 was permitted to open its contacts 107 immediately after its coil was disconnected from lines 17 and 18, the first circuit would be opened by the opening of contacts 107 at substantially the same instant that it was completed by the closing of contacts 104 and 122. This however is prevented by the previously described time delay characteristics of relay 106 which keeps its contacts 107 closed for a predetermined time interval after its coil is disconnected from lines 17 and 18. The first circuit and hence relay 71 therefore remain closed for a predetermined time interval during each revolution of motor 111. When relay 71 is closed it connects series motor 58 to lines 17 and 18 so that its direction of rotation is correct for shifting yokes 55 and 57 relatively to each other in a suitable manner so that exciting windings 44 causes machine 42 to generate a voltage component capable of bringing about the zero vector difference if motor 23 was driven at synchronous speed and exciting winding 45 causes machine 42 to generate another voltage component which opposes the voltage induced in the secondary winding of motor 23. Yokes 55 and 57 are thus moved during recurring predetermined time intervals to increase the induced voltage in the primary winding of motor 23 and when this voltage reaches 475 the automatic synchronizing device will operate to close switch 25 and connect the primary winding to source 10. The closing of switch 25 opens its contacts 36, thus causing switch 32 to open. The opening of switch 32 opens its contacts 86 thus disconnecting the coil of relay 83 from lines 17 and 18. Relay 83 opens it contacts 110 and closes its contacts 81. The opening of contacts 110 disconnects the closing coil of switch 112 from lines 17 and 18. The switch 112 opens and relay 115 comes to rest. The closing of contacts 81 does not however reconnect switch blades 67 and 68 to lines 17 to control the operation of series motor 58 because the closing of switch 25 closes its contacts 84 which connects the coil of relay 82 to lines 17 and 18, thus causing relay 82 to open its contacts 80 and interrupt the circuit to switch blades 67 and 68. The operation of relay 82 also closes its contacts 125, the purpose of these contacts being described later. Switch blade 91 of relay 87 returns to its midposition when switch 25 is closed because source 10 and the motor primary winding now have practically the same voltage. The contacts of relay 115 are opened and closed at a rate which is directly proportional to the slip frequency of motor 23 because I prefer to describe motor 111 as a synchronous motor, although 111 may be an induction motor with substantially the same result. This feature of the operation of relay 115 tends to equalize the time required for synchronizing motor 23 when it is driven at various speeds during the synchronizing period as will be more fully explained later.

Assume for example that motor 23 is brought to above its synchronous speed and when switch 48 is closed the induced voltage in the primary winding of motor 23 builds up to 450 volts. Motor 111 drives cam 113 counter-clockwise and contacts 123 and 124 are opened and closed once during each revolution of motor 111. Switch blade 91 of relay 87 closes contact 92. Relays 103, 106 and 115 operate in the manner described for below synchronous speed operation of motor 23 except that in relay 115 contacts 123 and 124 replace contacts 121 and 122 respectively. The use of contacts 123 in place of contacts 121 produces no difference in the described operation but the use of contacts 124 in place of contacts 122 causes relay 72 instead of relay 71 to be closed for a predetermined time interval during each revolution of motor 111. When relay 72 is closed it connects the series motor 58 to lines 17 and 18 so that its rotation is opposite to that with below synchronous speed operation of motor 23. Yokes 55 and 57 are therefore shifted during recurring predetermined time intervals in a manner opposite to that with below synchronous speed operation of motor 23, thus increasing the voltage in the primary winding of motor 23. When this voltage reaches 475, the automatic synchronizing device closes switch 25 and connects the primary winding to source 10.

When, for any reason, the synchronizing device fails to operate and the voltage of the primary winding of motor 23 is built up above that of source 10, as for example to 520 volts, the blade 91 of relay 87 closes contact 93. The closing of contact 93 completes the following circuit, from line 17, through blade 91, contact 93, coil of relay 97 and contacts 86 of switch 32 to line 18, this switch being closed. Relay 97 closes its contacts 99 which completes the following circuit, from line 17, through contacts 80 and 110 of relays 82 and 83 respectively, contacts 99 of relay 97, either one of switch blades 67 and 68 and the cooperating contact 69 or 70 as determined by the relative positions of yokes 55 and 57, and through one of the coils of relays 71 and 72, to line 18, depending on which of the contacts 69 or 70 is closed. From a previous description it should be clear that even if contact 93 is closed for only a very short time this circuit will operate to return yokes 55 and 57 quickly to their predetermined relative positions because the circuit is not interrupted by the operation of relay 115. In practically all cases, yokes 55 and 57 will be returned to their predetermined relative positions. It is clear that even if contact 93 is not closed sufficiently long to bring yokes 55 and 57 to their predetermined relative positions, the closing of contact 93 will in all events prevent the primary winding voltage from exceeding that of source 10 by more than a predetermined amount. By suitably adjusting springs 94 or the spacing of contact 93 from blade 91, this predetermined amount may be made to have any desired value.

It is seen that when switch 1 has its contact 2 closed and its contact 3 open, the relays 87 and 115 jointly control the operation of motor 58 to bring about the predetermined vector difference between the voltages of the source and of the primary winding of motor 23 when motor 23 is sometimes brought to below and sometimes to above its synchronous speed. It should therefore be obvious that the joint operation of relays 87 and 115 will also produce the above result when motor 23 is always brought either to below or to above its synchronous speed. It is also possible to produce the above result when motor 23 is always brought either to below or to above its synchronous speed without using relays 103, 106 and 115, by moving the blade 4 of switch 1 so that its contact 2 is open and its contact 3 is closed. Assume that motor 23 is always brought to below its synchronous speed before its primary winding is to be connected to source 10. Also assume that switch 1 now has its contact 2 open and its contact 3 closed. The closing of contact 3 connects the right hand contact 100 of relay 98 directly to an end of the coil of relay 71, thus short-circuiting the circuit from this contact 100 to the coil of relay 71 that had to be completed by contacts of relays 103, 106 and 115, while at the same time the opening of contact 2 opens the circuit from this contact 100 to relay 115 and to contacts 105 of relay 103, thus making relays 103, 106 and 115 inoperative. Now again assume that after motor 23 has been brought to slightly below its synchronous speed and switch 48 closed, thus closing contacts 110 of relay 83, that the voltage in the primary winding of motor 23 has built up to 450 volts, thus causing contacts 100 of relay 98 to close as previously described. The closing of contacts 100 and 110 completes the following circuit, from line 17 through contacts 80, 110 and 100 of relays 82, 83 and 98 respectively, through contact 3 of switch 1 and the coil of relay 71 to line 18. Relay 71 will close and connect motor 58 to lines 17 and 18 and motor 58 will rotate uninterruptedly to shift yokes 55 and 57 to increase the voltage induced in the primary winding of motor 23, and when this voltage reaches 475 the automatic synchronizing device closes switch 25 and connects the primary winding to source 10. When motor 23 is always brought to above its synchronous speed before its primary winding is to be connected to source 10, the above results can be obtained by connecting the contact 3 of switch 1 to an end of the coil of relay 72 instead of relay 71. If the induced voltage in the primary winding of motor 23 builds up to above that of source 10, the yokes 55 and 57 will be brought back to their predetermined relative positions in the same manner as previously described. The relays 103, 106 and 115 were not used and may therefore be eliminated, thus greatly reducing the cost of the control apparatus. When relays 103, 106 and 115 are used, the motor 58 is rotated during recurring predetermined time intervals, whereas when they are not used the motor 58 is rotated uninterruptedly, otherwise identical results are produced in both cases.

After motor 23 is connected to source 10, yokes 55 and 57 are moved in response to the current flowing between the source and the motor by suitable current responsive means as shown for example by 51' in Fig. 1 of United States Patent 1,778,599. To simplify the drawing and description of my invention I have represented 51' in my drawing as a current responsive relay 126 without showing the current and potential transformers between the relay and the source. Relay 126 has a movable switch blade 127 and two stationary normally open contacts 128 and 129. Relay 126 produces the desired shifting of yokes 55 and 57 by closing contact 128 or 129. It is desirable that relay 126 automatically assume control of series motor 58 and hence of yokes 55 and 57 immediately after motor 23 is connected to source 10. This result is obtained in the following manner. The closing of switch 25 closes its contacts 84, thus connecting the coil of relay 82 to lines 17 and 18. Relay 82 closes its contacts 125, thus providing the following circuit, from line 17 through contacts 125 of relay 82, contact 128 or 129 of relay 126, depending on which contact is closed by blade 127, and either one of the coils of relays 71 and 72 to line 18. The series motor 58 and hence the movement of yokes 55 and 57 will now be controlled in response to the current responsive relay 126.

In my present patent application I prefer to illustrate and give a brief description of the operation of the automatic synchronizing device illustrated and described in my previously mentioned patent because in accordance with my present invention I have incorporated into the operation of this device an additional control feature to prevent false operation of the device to connect motor 23 to source 10. An operating description of my additional control feature follows the description of the construction and normal operation of this device.

The synchronizing device comprises a relay 130 having a pair of normally closed contacts 131 and a pair of normally open contacts 132. The coil of relay 130 is connected in series with a resistance 133 and auxiliary contacts 134 of switch 32 across the secondary winding of transformer 96 through a grounded circuit. A relay 135 has two pairs of normally open contacts 136 and 137. With relay 135 in its normal position, (as shown) its coil may be connected to lines 17 and 18 only when relay 130 operates to close its contacts 132. The closing of contacts 132 completes the following circuit, from line 17, through auxiliary contacts 138 on switch 25, lead 139, contacts 101 and 102 of relays 97 and 98 respectively, lead 140, coil of relay 135 and contacts 132 to line 18. The relay 135 operates and closes its contacts 136 and 137. The closing of contacts 136 completes a locking circuit for the coil of relay 135, this circuit being the same as the last described circuit for this coil except that contacts 136 of relay 135 replace contacts 132 of relay 130. A short-circuiting switch 141 is connected across leads 139 and 140.

It is obvious that when switch 141 is closed the two described circuits for the coil of relay 135 may be completed when contacts 101 and 102 of relays 97 and 98 are open. The contacts 137 of relay 135 are connected in series with resistance 133 across the secondary winding of transformer 95 through a grounded circuit. The closing coil of switch 25 is connected to lines 17 and 18 only when contacts 131 and 136 of relays 130 and 135 respectively are closed at the same time. When the frequency of the source 10 is fairly constant during the starting period of motor 23 the synchronizing device is preferably operated with switch 141 closed and when not fairly constant switch 141 is left open.

Assume that the frequency of the source 10 is fairly constant and that switch 141 is closed. The closing of switch 32 closes its auxiliary contacts 134 and connects the coil of relay 130 in series with resistance 133 across the secondary winding of transformer 96. Assume that when switch 48 is closed the induced voltage in the primary winding of motor 23 is 450 volts, that this voltage is insufficient to operate relay 130 and that resistance 133 is amply sufficient to limit the current in the coil of relay 130 to a safe value. Relay 87, or relays 87 and 115 operate as previously described to increase the voltage of the primary winding of motor 23 and when this voltage reaches a predetermined value, as for example 460 volts, relay 130 operates and closes its contacts 132. The closing of contacts 132 causes relay 135 to operate and close a locking circuit for its coil through its contacts 136. The operation of relay 135 also closes its contacts 137, thus connecting the coil of relay 130 in series with the secondary windings of transformers 95 and 96, and hence the vector difference between the voltages of source 10 and the primary winding of motor 23 is impressed on this coil. The current flowing through resistance 133 does not flow through the coil of relay 130 because the voltage of source 10 is higher than that of the motor primary winding. It was previously assumed as an example that switch 25 is to be closed when the vector difference between the voltages of source 10 and the motor primary winding has a maximum value of 25 volts and that this corresponds to 475 volts on the motor primary winding with 500 volts on source 10. The coil of relay 130 is so proportioned that when the primary winding voltage has been sufficiently increased to produce this vector difference the energization of this coil is sufficiently reduced so that relay 130 drops and closes its contacts 131. The closing of contacts 131 connects the closing coil of switch 25 to lines 17 and 18, (the contacts 136 on relay 135 having been previously closed) and switch 25 closes. The closing of switch 25 opens its auxiliary contacts 138 and also causes the opening of switch 32 which opens its auxiliary contacts 134, thus returning relays 130 and 135 to their normal positions with the coil of relay 130 and resistance 133 not energized.

The above described operation of the synchronizing device is similar to that given in my previously mentioned patent and is the normal operation of the device. The need for my previously mentioned additional control feature to the operation of this device arises when there are substantial variations in the frequency, or voltage, or both of source 10 during the starting period of motor 23. Thus, assume that 25 cycles and 500 volts is the normal frequency and voltage of source 10. Now, return to the previously described operations of the synchronizing device and assume that relay 130 has just operated to open its contacts 131 and close its contacts 132. The closing of contacts 132 causes relay 135 to operate and establish a locking circuit for itself which will not be opened until main switch 25 is closed because switch 141 is closed. The coil of relay 130 therefore will be subjected to the vector difference between the voltages of source 10 and of the primary winding of motor 23 until switch 25 is closed. Assume for example that the frequency of source 10 suddenly increases to 26 cycles, the voltage remaining at 500 volts. The speed of starting motor 30 does not immediately increase to the value corresponding to 26 cycles because of the inertia effects of the various revolving elements, especially those of motors 12 and 23. This causes a temporary increase in the frequency of the voltages delivered by brushes 54 and 56 of frequency changer 46, thus increasing the reactance of the exciting windings 44 and 45 and decreasing the currents flowing through them. This results in a decrease of the voltage impressed on the secondary winding of motor 23, while at the same time the induced voltage in its secondary winding increases. The net result is that the primary winding voltage of motor 23 decreases materially below 460, as for example to 440 volts, thus increasing the vector difference between the voltages of the source and the primary winding and hence increasing the current flowing in the coil of relay 130. If the voltage of source 10 should increase at the same time that the frequency increased, the difference between the voltage of the source and the motor primary winding voltage will be further increased because of the time lag due to the inductance of the windings in machines 23, 42 and 46. If the frequency, voltage, or both, of source 10 should further increase, the difference between the voltage of the source and the motor primary winding voltage will be further increased, and it is obvious that these variations may result in the burning out of the coil of relay 130. This would cause the relay 130 to drop and close its contacts 131, thereby effecting the closing of switch 25 since contacts 136 of relay 135 are closed. The primary winding of motor 23 would therefore be connected to source 10 when the difference between the voltage of the source and the motor primary winding voltage is considerably above 25 volts, and it is therefore clear that this false operation of the synchronizing device should be prevented.

This false operation is prevented by my additional control feature which consists of opening switch 141 so as to connect the coil of relay 135 in series with contacts 101 and 102 of relays 97 and 98 respectively and adjusting relay 87 so that it requires a difference of slightly over 25 volts between the voltages of source 10 and the primary winding of motor 23 to cause blade 91 to close contact 92 or 93. Assume that during the synchronizing period there is a sufficient variation in the frequency, voltage, or both, of source 10 to cause, for reasons previously described, a sufficient difference between the voltages of source 10 and the primary winding of motor 23 to cause operation of relay 87. The operation of relay 87 causes the opening of contacts 101 and 102 of relays 97 or 98 respectively, depending on which is the higher as between the voltages of source 10 and the motor primary winding. The opening of either of these contacts opens the locking circuit of the coil of relay 135, causing this relay to open its contacts 136 and 137. The opening of contacts 137 leaves the coil of relay 130 in series with resistance 133 across the secondary of transformer 96, thus preventing excessive current flow in this coil and therefore preventing false operation of the synchronizing device. It is obvious that the frequency or voltage of source 10 will not indefinitely increase and will eventually start decreasing toward their normal values. The previously described time lag effects due to inertia and inductance will now operate to decrease the difference between the voltages of the source and the motor primary winding from the value this difference had prior to a decrease in frequency or voltage of source 10. If the decrease toward normal values of source 10 proceeds far enough there will be produced a difference of 25 volts or less between the source 10 and the primary winding of motor 23 and, therefore, contacts 101 and 102 will be closed and the synchronizing device will operate as previously described to close switch 25. It is clear that my additional control feature prevents damage to and false operation by the synchronizing device.

Assume motor 23 is connected to source 10, switch 48 closed and that for some reason the motor 23 is to be disconnected from the source. Switch 48 should be opened after switch 25 is opened. This is accomplished in the following manner. One end of coils 29 and 52 surrounding tripping plungers 28 and 53 respectively are connected in series with a switch 142 to line 18. The other ends of coils 29 and 52 are respectively connected in series with auxiliary contacts 143 and 144 of switch 25 to line 17. Switch 142 may be closed manually or by means responsive to an overload or fault condition on source 10 or in motor 23, these means not being shown as they are well known to those skilled in the art and form no part of my invention. The closing of switch 142 energizes coil 29, (contacts 143 being closed) thus opening main switch 25 which closes its auxiliary contacts 144. The closing of contacts 144 energizes coil 53 which causes the opening of switch 48.

The following is a brief summary of the operation of the arrangement shown in my drawing. Assume all parts at rest and in their normal positions and switch 1 with its contact 2 closed and its contact 3 open. Yokes 55 and 57 on frequency changer 46 are automatically brought to their predetermined relative positions. The same will be true of arms 60 and 62 controlling resistances 59 and 61. The closing of push button 34 causes switch 32 to close and connect starting motor 30 to source 10. The closing of switch 32 also establishes a locking circuit for itself and connects the coil of relay 130 in series with resistance 133 across the secondary winding of transformer 96. When starting resistance 37 of the motor 30 is cut out, extension 40 closes contacts 41 causing switch 48 to close. The closing of switch 48 causes relay 83 to pick up and close its contacts 110. The closing of contacts 110 causes switch 112 to close, thus starting rotation of motor 111. The closing of contacts 110 also connects relays 87 and 115 to control relays 71 and 72, therefore placing the operation of motor 58 under the control of relays 87 and 115. Relays 87 and 115 control series motor 58 so that the latter shifts yokes 55 and 57 to bring about the predetermined vector difference between the voltages of source 10 and of the primary winding of motor 23, and when this vector difference occurs the automatic synchronizing device operates to close switch 25, thus connecting motor 23 to source 10. The closing of switch 25 causes relay 82 to pick up and close its contacts 125. The closing of contacts 125 connects relay 126 to control relays 71 and 72, therefore placing the operation of motor 58 under the control of relay 126. The closing of switch 25 also causes the opening of switch 32. The opening of switch 32 causes relay 83 to open its contacts 110, thus opening switch 112. The closing of switch 25 and the opening of switch 32 also cause the synchronizing device and all other relays to return to their normal positions.

Motor 12 may now be synchronized in the usual manner and connected to source 11 by closing push button 19, thus placing the frequency converter set in operation. Assume that this has been done and that during operation an overload or fault condition on the source 10 or in motor 23 occurs, thus causing operation of switch 142 which in turn trips switch 25 open. The opening of switch 25 causes yokes 55 and 57 on frequency changer 46 to return to their predetermined relative positions. The same will be true of arms 60 and 62 controlling resistances 59 and 61. motor 23 however continues to rotate as it is driven by synchronous motor 12 which remains connected to source 11. The speed of motor 23 now depends on the frequency of source 11 and this frequency may not be the same every time a trip-out occurs. Motor 23 may therefore be driven at, above, or below its synchronous speed after a trip-out occurs. It is under these conditions that relay 115 is particularly useful since as previously described this relay 115 will operate with above or below synchronous speed of motor 23 to bring about proper shifting of yokes 55 and 57, whereas at synchronous speed of motor 23 no operation is required from relay 115. Assume that the overload or fault condition has been removed and motor 23 is to be reconnected to source 10. This is accomplished by closing push button 34 which starts the previously described sequence of operations. The starting resistance 37 may be cut out rapidly because motor 23 is already up to speed.

An arrangement of control devices substantially similar to that illustrated in the attached drawing has been constructed and installed in connection with a large induction motor acting as one element of a frequency converter set and the arrangement is giving very satisfactory operation.

I have illustrated and described my invention in connection with a wound secondary induction motor acting as one element of a frequency converter set or used for driving the usual type of motor load, but it will be obvious to those skilled in the art that my invention is equally applicable to an asynchronous machine used for any purpose. Accordingly I wish it understood that the embodiment represented is merely illustrative of the principles of my invention and that all modifications falling within the true spirit and scope of my invention are intended to be included within the scope of the appended claims.

What I claim as new and desire to secure by Letters Patent of the United States, is:

1. In combination, a source of alternating current, an asynchronous machine having relatively rotatable primary and secondary windings, driving means for bringing the rotatable winding to approximately its synchronous speed, means energized by said source for producing a voltage whose frequency equals the slip frequency of said machine, means for impressing said slip frequency voltage on said secondary winding, thereby inducing in said primary winding a voltage having the frequency of said source, and means responsive to operation of the rotatable winding away from its synchronous speed and responsive to the difference between the voltages of said source and of said primary winding for varying the slip frequency voltage impressed on said secondary windings.

2. In combination, a source of alternating current, an asynchronous machine having relatively rotatable primary and secondary windings, driving means for bringing the rotatable winding to approximately its synchronous speed, means energized by said source for producing a voltage whose frequency equals the slip frequency of said machine, means for impressing said slip frequency voltage on said secondary winding, thereby inducing in said primary winding a voltage having the frequency of said source, and means responsive to operation of the rotatable winding away from its synchronous speed and responsive to the difference between the voltages of said source and of said primary winding for varying the slip frequency voltage impressed on said secondary winding during recurring predetermined time intervals to produce a predetermined vector difference between the voltages of said source and of said primary winding.

3. In combination, a source of alternating current, an asynchronous machine having relatively rotatable primary and secondary windings, driving means for bringing the rotatable winding to approximately its synchronous speed, means energized by said source for producing a voltage whose frequency equals the slip frequency of said machine, means for initially impressing on said secondary winding a predetermined value of said slip frequency voltage capable of producing with synchronous speed of the rotatable winding a vector difference between the voltage of said source and the voltage induced in said primary winding having a magnitude lying between predetermined values, the voltage induced in said primary winding having the frequency of said source, and means responsive to operation of the rotatable winding away from its synchronous speed and responsive to the difference between the voltages of said source and of said primary winding when the voltage of the latter is lower than that of said source for increasing the slip frequency voltage impressed on said secondary winding to produce said vector difference.

4. In combination, a source of alternating current, an asynchronous machine having relatively rotatable primary and secondary windings, driving means for bringing the rotatable winding to approximately its synchronous speed, means energized by said source for producing a voltage whose frequency equals the slip frequency of said machine, a dynamo electric machine energized by said slip frequency voltage producing means, means for impressing on said secondary winding a slip frequency voltage whose magnitude is responsive to the voltage produced by said dynamo electric machine, thereby inducing in said primary winding a voltage having the frequency of said source, movable means associated with said slip frequency voltage producing means for varying the energization of said dynamo electric machine, and means responsive to operation of the rotatable winding away from its synchronous speed and responsive to the difference between the voltages of said source and of said primary winding for actuating said movable means to produce a predetermined vector difference between the voltages of said source and of said primary winding.

5. In combination, a source of alternating current, an asynchronous machine having relatively rotatable primary and secondary windings, driving means for bringing the rotatable winding to approximately its synchronous speed, means energized by said source for producing a voltage whose frequency equals the slip frequency of said machine, a dynamo electric machine energized by said slip frequency voltage producing means, means for impressing on said secondary winding a slip frequency voltage whose magnitude is responsive to the voltage produced by said dynamo electric machine, thereby inducing in said primary winding a voltage having the frequency of said source, movable means associated with said slip frequency voltage producing means for varying the energization of said dynamo electric machine, and means responsive to operation of the rotatable winding away from its synchronous speed and responsive to the difference between the voltages of said source and of said primary winding for actuating said movable means during recurring predetermined time intervals to produce a predetermined vector difference between the voltages of said source and of said primary winding.

6. In combination, a source of alternating current, an asynchronous machine having relatively rotatable primary and secondary windings, driving means for bringing the rotatable winding to approximately its synchronous speed, means energized by said source for producing a voltage whose frequency equals the slip frequency of said machine, a dynamo electric machine energized by said slip frequency voltage producing means, means for impressing on said secondary winding a slip frequency voltage whose magnitude is responsive to the voltage produced by said dynamo electric machine, thereby inducing in said primary winding a voltage having the frequency of said source, relatively movable means associated with said slip frequency voltage producing means for varying the energization of said dynamo electric machine, means responsive to the relative positions of said movable means for initially actuating said movable means to predetermined relative positions, said positions being capable of producing with synchronous speed of the rotatable winding a vector difference between the voltages of said source and of said primary winding having a magnitude lying between predetermined values, and means responsive to operation of the rotatable winding away from its synchronous speed and responsive to the difference between the voltages of said source and of said primary winding when the voltage of the latter is lower than that of said source for actuating said movable means from said predetermined relative positions to increase the voltage impressed on said secondary winding to produce said vector difference.

7. In combination, a source of alternating current, an asynchronous machine having relatively rotatable primary and secondary windings, driving means for bringing the rotatable winding to approximately its synchronous speed, means energized by said source for producing a voltage whose frequency equals the slip frequency of said machine, a dynamo electric machine energized by said slip frequency voltage producing means, means for impressing on said secondary winding a slip frequency voltage whose magnitude is responsive to the voltage produced by said dynamo electric machine, thereby inducing in said primary winding a voltage having the frequency of said source, relatively movable means associated with said slip frequency voltage producing means for varying the energization of said dynamo electric machine, means responsive to the relative positions of said movable means for initially actuating said movable means to predetermined relative positions, said positions being capable of producing with synchronous speed of the rotatable winding a vector difference between the voltages of said source and of said primary winding having a magnitude lying between predetermined values, means responsive to operation of the rotatable winding away from its synchronous speed and responsive to the difference between the voltages of said source and of said primary winding when the voltage of the latter is lower than that of said source for actuating said movable means from said predetermined relative positions to increase the voltage impressed on said secondary winding to produce said vector difference, and means responsive to the difference between the voltages of said source and of said primary winding when the voltage of the latter is higher than that of said source and responsive to the relative positions of said movable means for actuating said movable means to said predetermined relative positions.

8. In combination, a source of alternating current, an asynchronous machine having relatively rotatable primary and secondary windings, driving means for bringing the rotatable winding to approximately its synchronous speed, means energized by said source for producing a voltage whose frequency equals the slip frequency of said machine, a dynamo electric machine energized by said slip frequency voltage producing means, means for impressing on said secondary winding a slip frequency voltage whose magnitude is responsive to the voltage produced by said dynamo electric machine, thereby inducing in said primary winding a voltage having the frequency of said source, relatively movable means associated with said slip frequency voltage producing means for varying the energization of said dynamo electric machine, means responsive to the relative positions of said movable means for initially actuating said movable means to predetermined relative positions, said positions being capable of producing with synchronous speed of the rotatable winding a vector difference between the voltages of said source and of said primary winding having a magnitude lying between predetermined values, means responsive to operation of said rotatable winding below its synchronous speed and responsive to the difference between the voltages of said source and of said primary winding for actuating said movable means relatively to each other in one manner from said predetermined relative positions to bring about said vector difference, and means responsive to operation of said rotatable winding above its synchronous speed and responsive to the difference between the voltages of said source and of said primary winding for actuating said movable means relatively to each other in the opposite manner from said predetermined relative positions to bring about said vector difference.

9. In combination, a source of alternating current, an asynchronous machine having relatively rotatable primary and secondary windings, driving means for bringing the rotatable winding to approximately its synchronous speed, means energized by said source for producing a voltage whose frequency equals the slip frequency of said machine, a dynamo electric machine energized by said slip frequency voltage producing means, means for impressing on said secondary winding a slip frequency voltage whose magnitude is responsive to the voltage produced by said dynamo electric machine, thereby inducing in said primary winding a voltage having the frequency of said source, movable means associated with said slip frequency voltage producing means for varying the energization of said dynamo electric machine, and means for actuating said movable means to produce a predetermined vector difference between the voltages of said source and of said primary winding, said actuating means comprising an electrically operated device for driving said movable means, a control current source, a relay having a pair of normally open contacts, electro-responsive means for effecting the closing of said relay, a circuit including said pair of contacts for effecting the energization of said device by said last-mentioned source when said circuit is closed, said circuit remaining open in at least one place when said pair of contacts are closed, means responsive to a predetermined difference between the voltages of said source and of said primary winding for connecting said electro-responsive means to said last-mentioned source, means responsive to operation of said rotatable winding away from its synchronous speed for recurringly closing and opening said circuit and recurringly disconnecting and reconnecting said electro-responsive means from and to said last-mentioned source, the closing of said circuit and the disconnecting of said electro-responsive means from said last-mentioned source occurring at substantially the same instant, and means for retaining said pair of contacts closed for a predetermined time interval during each period said electro-responsive means is disconnected from said last-mentioned source.

10. In combination, a source of alternating current, an asynchronous machine having relatively rotatable primary and secondary windings, driving means for bringing the rotatable winding to approximately its synchronous speed, means energized by said source for producing a voltage whose frequency equals the slip frequency of said machine, a dynamo electric machine energized by said slip frequency voltage producing means, means for impressing on said secondary winding a slip frequency voltage whose magnitude is responsive to the voltage produced by said dynamo electric machine, thereby inducing in said primary winding a voltage having the frequency of said source, movable means associated with said slip frequency voltage producing means for varying the energization of said dynamo electric machine, relay means responsive to a predetermined difference between the voltages of said source and of said primary winding, relay means responsive to operation of the rotatable winding away from its synchronous speed, and relay means responsive to the operation of the first and second mentioned relay means for actuating said movable means to produce a predetermined vector difference between the voltages of said source and of said primary winding.

11. In combination, two alternating current sources, a switch for connecting said sources, electro-responsive means for effecting the closing of said switch, a relay having a winding energized in response to the voltage of one of said sources, means responsive to a predetermined energization of said relay winding and responsive to the difference between the voltages of said sources when said difference is below a predetermined value for connecting said relay winding so that the latter is energized in response to the vector difference between the voltages of said sources, and means responsive to a subsequent predetermined reduction in the energization of said relay winding while said relay winding remains energized in response to the vector difference between the voltages of said sources for effecting energization of said electro-responsive means only when the difference between the voltages of said sources remains below said predetermined value.

12. In combination, two alternating current sources, a switch for connecting said sources, electro-responsive means for effecting the closing of said switch, a relay having a winding energized in response to the voltage of one of said sources, a second relay having a winding, means responsive to a predetermined energization of the first-mentioned relay winding and responsive to the difference between the voltages of said sources when said difference is below a predetermined value for effecting energization of the second-mentioned relay winding, means responsive to the energization of the second-mentioned relay winding for connecting the first-mentioned relay winding so that the latter is energized in response to the vector difference between the voltages of said sources, means responsive to a subsequent predetermined reduction in the energization of the first-mentioned relay winding while said first-mentioned relay winding remains energized in response to the vector difference between the voltages of said sources for effecting energization of said electro-responsive means only while the second-mentioned relay winding remains energized, and means responsive to the difference between the voltages of said sources for effecting de-energization of the second-mentioned relay winding when the difference between the voltages of said sources exceeds said predetermined value.

13. In combination, a source of alternating current, an asynchronous machine having relatively rotatable primary and secondary windings, driving means for bringing the rotatable winding to approximately its synchronous speed, a switch for connecting said primary winding to said source, means energized from said source for producing a voltage whose frequency equals the slip frequency of said machine, a switch between said last-mentioned means and said source, a dynamo electric machine energized by said slip frequency voltage producing means, means for impressing on said secondary winding a slip frequency voltage whose magnitude is responsive to the voltage produced by said dynamo electric machine, thereby inducing in said primary winding a voltage having the frequency of said source, movable means associated with said slip frequency voltage producing means for varying the energization of said dynamo electric machine, an electrically operated device for actuating said movable means, a source of current for energizing said device, relay means responsive to operation of the rotatable winding away from its synchronous speed, relay means responsive to a predetermined difference between the voltages of said first-mentioned source and of said primary winding, relay means responsive to the current flowing between said first-mentioned source and said primary winding when the latter is connected to said first-mentioned source, means responsive to the open position of the first-mentioned switch and the closed position of the second-mentioned switch for connecting the first- and second-mentioned relay means to control the energization of said device from said last-mentioned source, and means responsive to the closed position of the first-mentioned switch for connecting the last-mentioned relay means to control the energization of said device from said last-mentioned source.

14. In combination, a source of alternating current, an asynchronous machine having relatively rotatable primary and secondary windings, driving means for bringing the rotatable winding to approximately its synchronous speed, a switch for connecting said primary winding to said source, means energized from said source for producing a voltage whose frequency equals the slip frequency of said machine, a switch between said last-mentioned means and said source, a dynamo electric machine energized by said slip frequency voltage producing means, means for impressing on said secondary winding a slip frequency voltage whose magnitude is responsive to the voltage produced by said dynamo electric machine, thereby inducing in said primary winding a voltage having the frequency of said source, relatively movable means associated with said slip frequency voltage producing means for varying the energization of said dynamo electric machine, an electrically operated device for actuating said movable means, a source of current for energizing said device, relay means responsive to the relative positions of said movable means, relay means responsive to the operation of the rotatable winding away from its synchronous speed, relay means responsive to the difference between the voltages of said source and of said primary winding, means responsive to the open positions of both of said switches for connecting the first-mentioned relay means to control the energization of said device from said last-mentioned source, and means responsive to the open position of the first-mentioned switch and the closed position of the second-mentioned switch for connecting the second and third-mentioned relay means to control the energization of said device from said last-mentioned source.

15. In combination, a source of alternating current, an asynchronous machine having relatively rotatable primary and secondary windings, driving means for bringing the rotatable winding to approximately its synchronous speed, means energized by said source for producing a voltage whose frequency equals the slip frequency of said machine, means for impressing said slip frequency voltage on said secondary winding, thereby inducing in said primary winding a voltage having the frequency of said source, and means responsive to the difference between the voltages of said source and of said primary winding for varying the slip frequency voltage impressed on said secondary winding.

16. In combination, a source of alternating current, an asynchronous machine having relatively rotatable primary and secondary windings, driving means for bringing the rotatable winding to approximately its synchronous speed, means energized by said source for producing a voltage whose frequency equals the slip frequency of said machine, means for initially impressing on said secondary winding a predetermined value of said slip frequency voltage capable of producing with synchronous speed of the rotatable winding a vector difference between the voltage of said source and the voltage induced in said primary winding having a magnitude lying between predetermined values, the voltage induced in said primary winding having the frequency of said source, and means responsive to the difference between the voltages of said source and of said primary winding when the voltage of the latter is lower than that of said source for increasing the slip frequency voltage impressed on said secondary winding to produce said vector difference.

17. In combination, a source of alternating current, an asynchronous machine having relatively rotatable primary and secondary windings, driving means for bringing the rotatable winding to approximately its synchronous speed, means energized by said source for producing a voltage whose frequency equals the slip frequency of said machine, a dynamo electric machine energized by said slip frequency voltage producing means, means for impressing on said secondary winding a slip frequency voltage whose magnitude is responsive to the voltage produced by said dynamo electric machine, thereby inducing in said primary winding a voltage having the frequency of said source, movable means associated with said slip frequency voltage producing means for varying the energization of said dynamo electric machine, and means responsive to the difference between the voltages of said source and of said primary winding for actuating said movable means to produce a predetermined vector difference between the voltages of said source and of said primary winding.

18. In combination, a source of alternating current, an asynchronous machine having relatively rotatable primary and secondary windings, driving means for bringing the rotatable winding to approximately its synchronous speed, means energized by said source for producing a voltage whose frequency equals the slip frequency of said machine, a dynamo electric machine energized by said slip frequency voltage producing means, means for impressing on said secondary winding a slip frequency voltage whose magnitude is responsive to the voltage produced by said dynamo electric machine, thereby inducing in said primary winding a voltage having the frequency of said source, relatively movable means associated with said slip frequency voltage producing means for varying the energization of said dynamo electric machine, means responsive to the relative positions of said movable means for initially actuating said movable means to predetermined relative positions, said positions being capable of producing with synchronous speed of the rotatable winding a vector difference between the voltages of said source and of said primary winding having a magnitude lying between predetermined values, means responsive to the difference between the voltages of said source and of said primary winding when the voltage of the latter is lower than that of said source for actuating said movable means from said predetermined relative positions to increase the voltage impressed on said secondary winding to produce said vector difference, and means responsive to the difference between the voltages of said source and of said primary winding when the voltage of the latter is higher than that of said source and responsive to the relative positions of said movable means for actuating said movable means to said predetermined relative positions.

19. In combination, a source of alternating current, an asynchronous machine having relatively rotatable primary and secondary windings, driving means for bringing the rotatable winding to approximately its synchronous speed, a switch for connecting said primary winding to said source, means energized by said source for producing a voltage whose frequency equals the slip frequency of said machine, means for impressing said slip frequency voltage on said secondary winding, thereby inducing in said primary winding a voltage having the frequency of said source, means responsive to the difference between the voltages of said source and of said primary winding for varying the slip frequency voltage impressed on said secondary winding to produce a predetermined vector difference between the voltages of said source and of said primary winding, and means responsive to said predetermined vector difference for closing said switch.

20. In combination, a source of alternating current, an asynchronous machine having relatively rotatable primary and secondary windings, driving means for bringing the rotatable winding to approximately its synchronous speed, a switch for connecting said primary winding to said source, means energized by said source for producing a voltage whose frequency equals the slip frequency of said machine, means for impressing said slip frequency voltage on said secondary winding, thereby inducing in said primary winding a voltage having the frequency of said source, means responsive to the operation of the rotatable winding away from its synchronous speed and responsive to the difference between the voltages of said source and of said primary winding for varying the slip frequency voltage impressed on said secondary winding to produce a predetermined vector difference between the voltages of said source and of said primary winding, and means responsive to said predetermined vector difference for closing said switch.

21. In a control system, the combination of an electrically operated control device, a source of current therefor, a relay comprising an energizing winding, a pair of normally open contacts and a pair of normally closed contacts; a second relay comprising an energizing winding and a pair of normally open contacts; a third relay comprising a movable arm biased to assume a normal stationary position, means for periodically moving said arm to a predetermined position on either side of its normal position, two pairs of normally open contacts adapted to be closed when said arm is at one of its predetermined positions, means for connecting the energizing winding of the first mentioned relay to said source in series with one of said two pairs of contacts, means for connecting said device to said source in series with the other of said two pairs of contacts and the normally open pairs of contacts of the first- and second-mentioned relays, the last-mentioned connecting means being adapted to give a desired manner of operation of said device, two pairs of normally open contacts adapted to be closed when said movable arm is at the other of its two predetermined positions, means for connecting the energizing winding of the first-mentioned relay to said source in series with one of said last-mentioned two pairs of contacts, means for connecting said device to said source in series with the other of said last-mentioned two pairs of contacts and the normally open pairs of contacts of the first- and second-mentioned relays, the last-mentioned connecting means being adapted to give the opposite manner of operation of said device, means for connecting the energizing winding of the second-mentioned relay to said source in series with the pair of normally closed contacts of the first-mentioned relay, and means for delaying the operation of the second-mentioned relay so that the latter opens its contacts a predetermined time interval after the opening of the normally closed pair of contacts of the first-mentioned relay.

In witness whereof I have hereunto set my hand.

GEORGE H. JUMP.